(12) United States Patent
Carson (10) Patent No.: US 7,710,854 B2
(45) Date of Patent: May 4, 2010

(54) MULTI-LAYER OPTICAL DISC FORMAT

(75) Inventor: Douglas M. Carson, Cushing, OK (US)

(73) Assignee: Doug Carson & Associates, Inc., Cushing, OK (US)

( * ) Notice: Subject to any disclaimer, the term of this patent is extended or adjusted under 35 U.S.C. 154(b) by 1258 days.

(21) Appl. No.: 10/543,328

(22) PCT Filed: May 28, 2004

(86) PCT No.: PCT/US2004/017070

§ 371 (c)(1),
(2), (4) Date: Jul. 22, 2005

(87) PCT Pub. No.: WO2004/109670

PCT Pub. Date: Dec. 16, 2004

(65) Prior Publication Data

US 2006/0087956 A1    Apr. 27, 2006

Related U.S. Application Data

(60) Provisional application No. 60/474,773, filed on May 30, 2003, provisional application No. 60/523,026, filed on Nov. 18, 2003.

(51) Int. Cl.
*G11B 7/24* (2006.01)
(52) U.S. Cl. .................................. 369/275.3
(58) Field of Classification Search ........................ None
See application file for complete search history.

(56) References Cited

U.S. PATENT DOCUMENTS

| | | |
|---|---|---|
| 4,090,031 A | 5/1978 | Russell |
| 5,283,159 A | 2/1994 | Norton et al. |
| 5,555,537 A | 9/1996 | Imaino et al. |
| 5,682,360 A | 10/1997 | Oshima |
| 5,761,301 A | 6/1998 | Oshima et al. |
| 5,881,032 A | 3/1999 | Ito et al. |
| 5,882,554 A | 3/1999 | Adachi |

(Continued)

FOREIGN PATENT DOCUMENTS

EP    1191524 A1    3/2002

(Continued)

*Primary Examiner*—Joseph H Feild
*Assistant Examiner*—Henok G Heyi
(74) *Attorney, Agent, or Firm*—Fellers, Snider, et al.

(57) ABSTRACT

An optical disc (102) and method for forming the same. The optical disc preferably includes a first substrate (150) comprising a pre-recorded, first data storage layer (152) and a second substrate (156) comprising a recordable, second data storage layer (158). The second substrate is affixed to the first substrate such that a data transducing beam (161) passes through a common exterior boundary surface (162) of the disc to access the respective first and second layers. Preferably, the pre-recorded layer comprises a sequence of pits and lands (218). Addresses of blocks in the respective layers preferably successively increment (220) so that a readback system (100) interprets the respective layers as a common recording layer within the disc. One of the layers can store disc authentication data zone, a patch which updates a version of user data stored in the remaining layer, etc. A content supplier can supply specially configured substrates with pre-recorded control data to control disc manufacture.

37 Claims, 6 Drawing Sheets

U.S. PATENT DOCUMENTS

| | | | |
|---|---|---|---|
| 5,959,946 A | 9/1999 | Tognazzini | |
| 5,963,536 A | 10/1999 | Vasic et al. | |
| 6,087,067 A | 7/2000 | Kato et al. | |
| 6,205,112 B1 | 3/2001 | Weidner | |
| 6,229,896 B1 | 5/2001 | Gotoh et al. | |
| 6,309,496 B1 | 10/2001 | Van Hoof | |
| 6,320,840 B1 | 11/2001 | Oh et al. | |
| 6,480,462 B2 | 11/2002 | Ha et al. | |
| 6,631,359 B1 | 10/2003 | Braitberg et al. | |
| 6,707,786 B2 | 3/2004 | Ikeya | |
| 6,756,103 B2 * | 6/2004 | Thompson et al. | 428/64.1 |
| 6,790,501 B2 * | 9/2004 | van de Grampel et al. | 428/64.1 |
| 7,012,860 B2 * | 3/2006 | Kondo | 369/44.26 |
| 7,452,582 B1 * | 11/2008 | Nobukuni et al. | 428/64.1 |
| 2004/0027974 A1 * | 2/2004 | Hisada et al. | 369/125 |
| 2004/0156294 A1 * | 8/2004 | Watanabe et al. | 369/94 |
| 2004/0196779 A1 * | 10/2004 | Aratani et al. | 369/288 |
| 2004/0202083 A1 * | 10/2004 | Ogawa et al. | 369/59.25 |
| 2004/0209034 A1 * | 10/2004 | Tompson et al. | 428/64.4 |
| 2005/0220303 A1 * | 10/2005 | Mizushima et al. | 380/201 |
| 2005/0270953 A1 * | 12/2005 | Okada et al. | 369/100 |
| 2006/0013111 A1 * | 1/2006 | Inoue et al. | 369/125 |

FOREIGN PATENT DOCUMENTS

| | | |
|---|---|---|
| JP | 11110826 A | 4/1999 |
| JP | 11312363 A | 11/1999 |
| JP | 2000215445 A | 8/2000 |
| JP | 2003077177 A | 3/2003 |
| WO | WO 00/79526 A1 | 12/2000 |

* cited by examiner

MULTI-LAYER OPTICAL DISC FORMAT

RELATED APPLICATIONS

The present application claims the benefit of PCT Patent Application PCT/US2004/17070 filed May 28, 2004, which in turn claimed the benefit of U.S. Provisional Patent Applications 60/474,773 filed May 30, 2003 and 60/523,026 filed Nov. 18, 2003.

FIELD OF THE INVENTION

The present invention relates generally to the field of optical disc technology and more particularly, but without limitation, to an improved optical disc format and a method for forming the same.

BACKGROUND

Optical discs are data storage media used to store a wide variety of digitally encoded data. Such discs are usually portable in nature and can be played in a variety of settings such as personal computers, car audio players, home theater systems, handheld personal entertainment devices, home gaming systems, etc.

A typical optical disc comprises a circular disc having one or more data storage (recording) layers of light reflective material embedded in a refractive substrate. Each layer is typically disposed along a plane substantially normal to an axis about which the disc is rotated and stores data in the form of localized areas of different reflectivity (pits and lands). The data can be stored along a continuously extending spiral track or a number of nested concentric tracks.

A data transducing head uses a laser or similar light source to output a readback signal based on the different reflectivities of the pit and land areas. Decoding circuitry decodes the user data for output by the appropriate playback device.

Optical discs can be pre-recorded or recordable. A pre-recorded disc typically includes an embedded metallized layer that stores the respective pits and lands. The metallized layer is formed during manufacturing of the disc using an injection molding process, and the data are permanently embossed in the disc once the disc manufacturing operation is completed.

Recordable discs are media to which data can be written. As used herein, "recordable" covers both discs that can be written once (WORM discs) or written and erased many times (rewritable discs). WORM discs typically utilize an embedded layer of dye or other material that can be selectively exposed to a write laser beam to permanently provide areas of different reflectivities corresponding to the pits and lands. Rewritable discs typically utilize a light beam to write the data as a series of areas of different reflectivity, and a magnetic field to erase the previously written data.

Pre-recorded optical discs have an advantage of low cost per byte of recorded data as long as each byte is the same on each copy of the optical disc. A disadvantage of pre-recorded optical discs is an inability to add some amount of unique information to each disc after the substrate has been manufactured, i.e. serial numbers, product activation codes, software "patches" or updates, etc.

Recordable optical discs have an advantage in that each disc can have unique data values recorded on them. A disadvantage of recordable optical discs is that all of the content data are recorded after manufacturing, thereby increasing the costs per byte. Generally, content suppliers tend to utilize pre-recorded discs for higher volume production runs where throughput efficiencies can be achieved, but are increasingly turning to the use of recordable discs for lower volume production runs.

There have been several attempts to create "hybrid" optical discs where one portion of the disc is pre-recorded and another portion is recordable. One goal of this approach is to take advantage of low cost per byte of pre-recorded data while providing the flexibility to add subsequent information to the disc. Examples of these types of discs include the Kodak® CD-PROM and the ODC™ CDR-ROM. Such discs typically have the pre-recorded portion and the recordable portion manufactured into a single surface of the substrate, which complicates the disc manufacturing process and thereby increases the costs per delivered byte. Other types of hybrid discs arrange the pre-recorded and recordable portions so as to be accessed from opposing sides of the disc, which requires two heads or the disc to be flipped over to access both portions.

Due to the continued demand for content provided on optical discs, there remains a continued need for improved disc formats that are relatively easy and inexpensive to implement, and provide flexibility to accommodate a variety of needs such as tracking and copy protection systems. It is to these and other improvements that the present invention is generally directed.

SUMMARY OF THE INVENTION

In accordance with preferred embodiments, an optical disc comprises a first substrate comprising a pre-recorded, first data storage layer and a second substrate comprising a recordable, second data storage layer. The second substrate is affixed to the first substrate such that a data transducing beam passes through a common exterior boundary surface of the disc to access the respective first and second data storage layers.

Preferably, the pre-recorded, first data storage layer comprises a sequence of pits and lands formed in said first data storage layer. Data are preferably recorded to the recordable, second data storage layer using a writing beam prior to the affixing of the second substrate to the first substrate.

Moreover, the first data storage layer preferably comprises first data stored in a first range of addressable blocks, the second data storage layer comprises second data stored in a second range of addressable blocks, and the first and second ranges successively increment over an overall range of addresses such that a readback system associated with the data transducing beam interprets the first data and the second data as being disposed on a common recording layer within said disc. The respective layers can both extend substantially across the entire radial extent of the disc, or alternatively one of the layers can have a reduced size so as to only extend partially across the entire radial extent of the disc.

Preferably, a selected one of the first and second data storage layers stores disc authentication data used to identify said disc as an authorized copy. Additionally, or alternatively, the recordable layer can be used to store a patch which updates a version of user data stored in the pre-recorded layer.

In accordance with further preferred embodiments, a method is provided comprising steps of forming a first substrate comprising a pre-recorded, first data storage layer, and affixing a second substrate to the first substrate to form an optical disc. The second substrate comprises a recordable, second data storage layer oriented such that a data transducing beam subsequently passes through a common boundary surface of the disc to access the respective first and second data storage layers.

The forming step preferably comprises providing a sequence of pits and lands in the first substrate to form the pre-recorded, first data storage layer, and the method further preferably comprises a step of using a writing beam to record data to the recordable, second data storage layer prior to the affixing step.

As before, addresses associated with the respective layers preferably successively increment over an overall range of addresses such that a readback system interprets the first data and the second data as being disposed on a common recording layer within said disc.

The respective layers can both extend substantially across the entire radial extent of the disc, or alternatively one of the layers can have a reduced size so as to only extend partially across the entire radial extent of the disc. A selected one of the first and second data storage layers can be used to store disc authentication data used to identify said disc as an authorized copy and can additionally, or alternatively, the recordable layer can be used to store a patch which updates a version of user data stored in the pre-recorded layer.

In accordance with further preferred embodiments, a method is provided comprising supplying content data and a specially configured substrate to a replication facility, with the specially configured substrate comprising a pre-recorded data storage layer which stores control data associated with the content data. At least one content data substrate is formed at the replication facility, the at least one content data substrate comprising a content data storage layer being configured to store said content data.

Thereafter, the specially configured substrate is affixed to the at least one content data substrate to form an optical disc, with the disc being adapted such that the pre-recorded data storage layer and the content data storage layer are respectively accessible through a common exterior boundary surface of the disc by a data transducing beam.

Various other features and advantages of preferred embodiments of the present invention will become clear upon a reading of the following detailed description in conjunction with the appended drawings.

DETAILED DESCRIPTION

Figure 1:
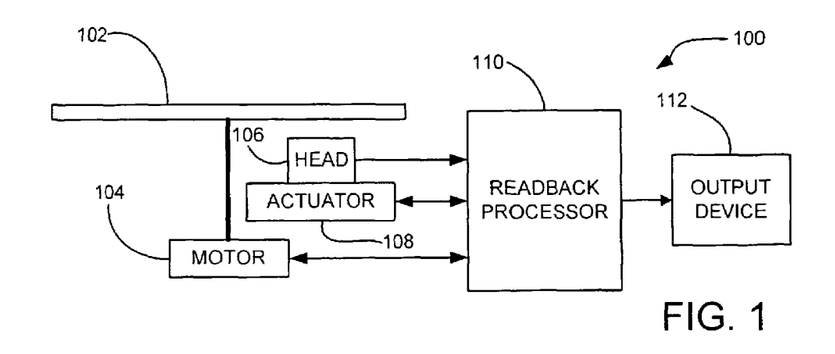
FIG. 1 provides a functional block diagram of an optical disc playback system.

Referring to FIG. 1, shown therein is an optical disc playback system 100 configured to read back data stored to an optical disc 102 constructed in accordance with various preferred embodiments depicted herein. A motor 104 rotates the disc 102 at a constant linear velocity (CLV) and an optical disc laser pickup assembly comprising a laser based transducing head 106 and a linear actuator assembly 108 decodes a data pattern from the disc 102. A readback processor 110 performs the requisite signal processing to output an analog output signal to an output device 112. The output device 112 can take a number of forms depending on the type(s) of data stored on the disc 102 and can thus comprise a home theater system, a computer system, a portable or automobile mounted optical disc player, etc.

Figure 2:
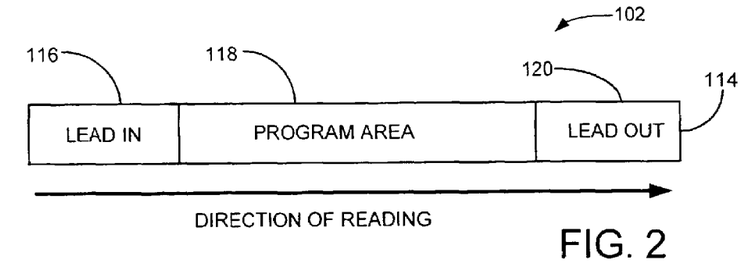
FIG. 2 generally illustrates a direction of reading for a single layer disc.

FIG. 2 generally illustrates the manner in which the disc 102 is accessed by the system 100 of FIG. 1 during a readback operation. The disc 102 is contemplated in FIG. 2 as a single sided, single layer disc such as a compact disc (CD, CD-ROM, CD-R, CD-R/W, etc.) or certain types of digital versatile discs (e.g., DVD-5).

A single data layer 114 includes a lead-in area 116 having a table of contents (TOC) or other preliminary information relating to the contents of the disc 102 (in program area 118). A lead-out area 120 indicates the end of the disc 102.

Figure 3:
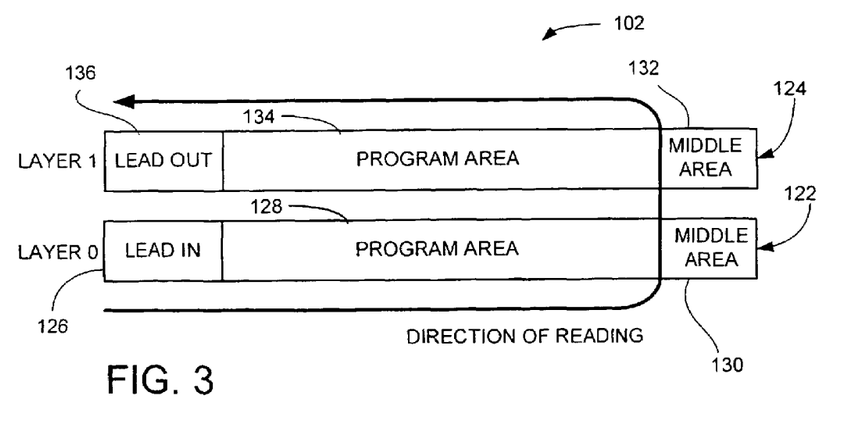
FIG. 3 generally illustrates a direction of reading for a multi-layer disc.

FIG. 3 illustrates the general manner in which the system 100 reads the disc 102 when the disc has a single side, two layer construction (e.g., DVD-9). The disc 102 in FIG. 3 includes two data layers 122, 124 (denoted as "Layer 0" and "Layer 1"). The first layer 122 (Layer 0) has a lead-in area 126 followed by a program area 128 and a middle area 130. The second layer 124 (Layer 1) has a middle area 132, a program area 134 and a lead-out area 136. During readback, the respective layers are read in the direction shown. The middle areas 130, 132 are typically skipped. The content information (e.g., table of contents) is stored in the lead-in area 106 to identify the contents of both program areas 128, 134.

Figure 4:
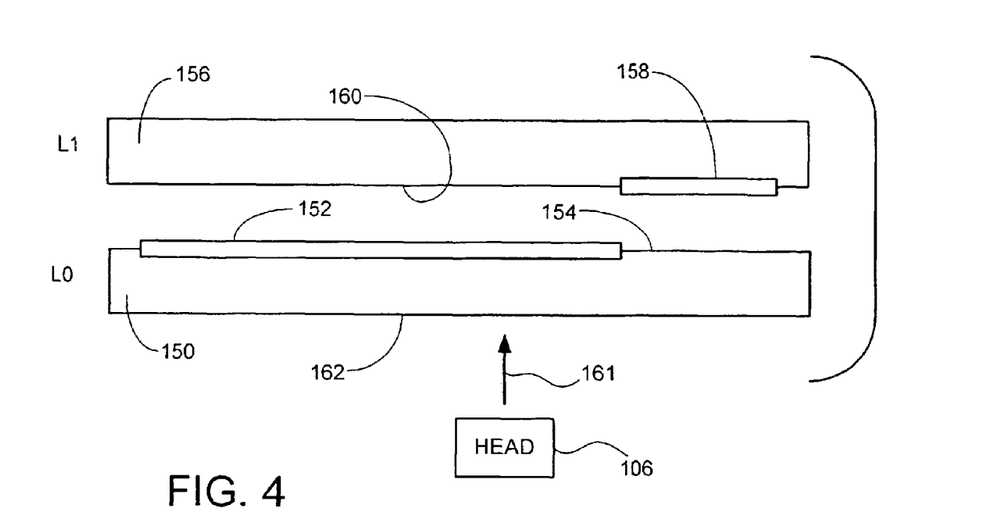
FIG. 4 provides a schematic depiction of an optical disc constructed in accordance with some preferred embodiments of the present invention.
Figure 5:
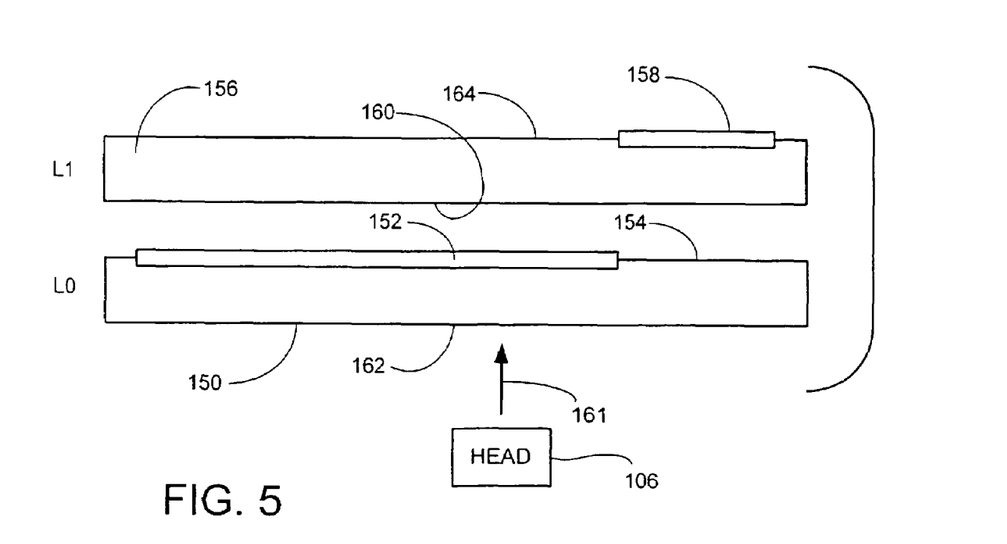
FIG. 5 provides a schematic depiction of an optical disc constructed in accordance with other preferred embodiments of the present invention.

In accordance with preferred embodiments, the optical disc 102 is provided with a multi-substrate construction such as generally represented by FIGS. 4 and 5. In FIG. 4, a first substrate 150 includes a pre-recorded, first data storage layer 152 (also referred to herein as layer L0) along a substrate boundary 154. A second substrate 156 includes a recordable, second data storage layer 158 (also referred to herein as layer L1) along a substrate boundary 160. During manufacturing, the second substrate 156 is affixed to the first substrate 150 to complete the disc 102 (preferably via an intervening layer, not shown). The respective data storage layers 152, 158 are thereafter accessed via a data transducing beam (depicted by arrow 161) from the head 106 through a common boundary surface 162 of the disc 102.

The embodiment of FIG. 5 is generally similar to that of FIG. 4, and like numerals have been used accordingly. However, in FIG. 5 the second data storage layer 158 is placed on a top surface 164 of the second substrate. As before, the respective layers 152, 158 are accessed through the common boundary surface 162.

Various alternative configurations and features of preferred embodiments of the present invention are envisioned. In some embodiments, a disc authentication zone is formed from one of the data storage layers 152, 158 at a location that is physically beyond the normal access areas (i.e., the lead-in, program and lead-out areas of FIGS. 2 and 3) and is used for disc authentication purposes.

In other embodiments, the disc 102 is configured to allow subsequent updating by the end user of the recordable layer 158. In yet other embodiments, addressing schemes are utilized such that the playback system 100 treats the two layers 152, 158 as a "single" recording layer so that, as far as the system is concerned, all of the data in the respective layers 152, 158 are viewed as being in a single layer (i.e., Layer 0 or Layer 1 of FIG. 3), irrespective of when the data are written to the recordable layer 158. These and other variations will now be discussed in turn.

Figure 6:
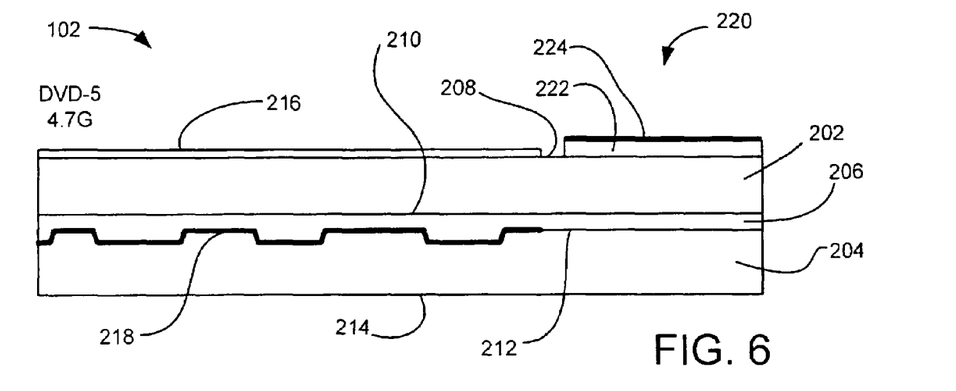
FIG. 6 depicts a DVD-5 optical disc configuration in accordance with a preferred embodiment.

FIG. 6 provides a generalized representation of the optical disc 102 in accordance with a first embodiment in which the disc is contemplated as comprising a pre-recorded DVD-5 disc. It will be noted that various aspect ratios and orientations have been exaggerated to simplify the following discussion.

As those skilled in the art will recognize, a DVD-5 disc is a single sided, single layer disc that stores about 4.7 gigabytes (G) of data. The disc is approximately 1.2 millimeters (mm) in thickness and formed of two approximately 0.6 mm polycarbonate subdiscs 202, 204 that are bonded together with a thin bonding layer 206.

The top subdisc 202 includes a top substrate boundary 208 and a bottom substrate boundary 210. The bottom subdisc 204 includes a top substrate boundary 212 and a bottom substrate boundary 214. A silkscreen or similar label 216 is affixed to the top substrate boundary 208 of the top subdisc 202 to provide human and/or machine (barcode, etc.) readable content information.

As mentioned previously, access to the disc 102 in FIG. 6 by the system 100 is made upwardly so that the data transducing beam from the optical pickup passes through the bottom substrate boundary 214 and into the polycarbonate bottom subdisc 204. The beam impinges upon a metallized reflective layer 218 formed on the top substrate boundary 212 of the bottom subdisc 204, and the relative reflectivities of the pits and lands formed therein are sensed in relation to a return beam that returns back through the bottom subdisc 204 and to the optical pickup.

This type of access is sometimes referred to as "second surface recording" since the transducing beam penetrates an outer surface of the disc 102 (i.e., the lower boundary 214) and passes through the substrate of the disc (i.e., the bottom polycarbonate subdisc 204) to access another, opposite surface of the substrate (i.e., the internal boundary 212). This is in contrast to "first surface recording" in which the transducing beam impinges an outer substrate boundary and does not penetrate the substrate.

The recording layer in the disc 102 in FIG. 6 is referred to as a disc authentication zone (identified at 220) and is also accessed using second surface recording techniques. The zone 220 is preferably formed by a series of wiggle pre-grooves (not shown for simplicity) in the top substrate boundary 208 of the top subdisc 202. A recording dye layer 222 is overlayed upon the pre-grooves, and a planar metallized reflective layer 224 is overlayed upon the recording dye layer 222.

During an access operation to the zone 220, the optical pickup adjusts the focal length so that the transducing beam passes through boundaries 214, 212, 210 and 208 (i.e., through subdiscs 204, 202) to focus upon the reflective layer 224. Data are selectively written to the recording layer 222 either prior to shipment of the disc 102 to the end user, or during activation of an application program by the end user. The data serve to identify the contents of the disc 102, provide a key for copy protection or other authentication purposes, etc.

As desired, the recording layer 222 can additionally or alternatively be configured to indicate the number of times that the disc 102 has been accessed. For example, an application routine can be configured so that each time the disc is accessed a digital "tally mark" is recorded to the zone 220. After a predetermined number of allowed accesses (e.g., 5), further access operations are denied.

Alternatively, commercially available, specially formulated dye can be used in the recording layer 222. Such dye degrades under normal transducing beam exposure. The operation of the disc 102 would be configured so that a seek is carried out to the zone 220; after an excessive number of accesses, the dye would be sufficiently degraded such that the seek could not be successfully carried out, and further access to the disc 102 would be denied.

Thus, while in a preferred embodiment a wiggle pre-groove is formed in the top boundary surface 208 to enable tracking by a recording system (DVD-R, etc.) during a subsequent writing operation to the zone 220, in an alternative embodiment an actual pit and land pattern is formed in the top boundary surface 208 so that an existing data set is provided to the zone, and this data set thereafter becomes inaccessible after repeated exposure to the dye layer 222.

Figure 7:
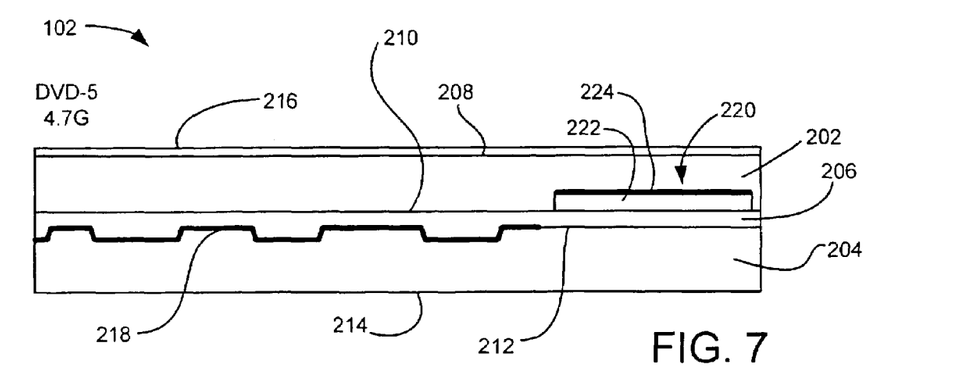
FIG. 7 depicts a DVD-5 optical disc configuration in accordance with another preferred embodiment.

FIG. 7 provides an alternative DVD-5 embodiment for the disc 102. The embodiment in FIG. 7 is similar to that shown in FIG. 6, except that the disc authentication zone 220 is adjacent the lower boundary 210 of the top subdisc 202 instead of being adjacent the upper boundary 208 as in FIG. 6. Thus, in this embodiment both the normal recording layer 218 and the authentication zone 220 are disposed within the composite substrate of the disc 102, albeit on different surfaces at different elevations. It will be understood that this embedded technique can likewise be adapted for the other embodiments presented below.

Figure 8:
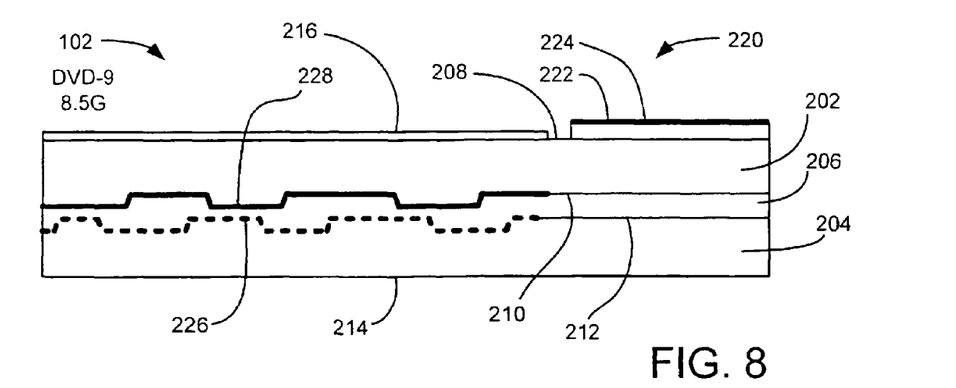
FIG. 8 is a DVD-9 optical disc configuration in accordance with another preferred embodiment.

FIG. 8 shows the disc 102 to generally have a single sided, two layer configuration in accordance with the DVD-9 format (with a capacity of 8.5 G). Like reference numerals are used for similar features in FIG. 8. The disc 102 in FIG. 8 includes a semi-reflective layer 226 on the boundary 212 of the bottom subdisc 204 and a reflective layer 228 on the boundary 210 of the top subdisc 202. As before, both recording layers 226, 228 as well as the authentication zone 220 are accessed from below.

Figure 9:
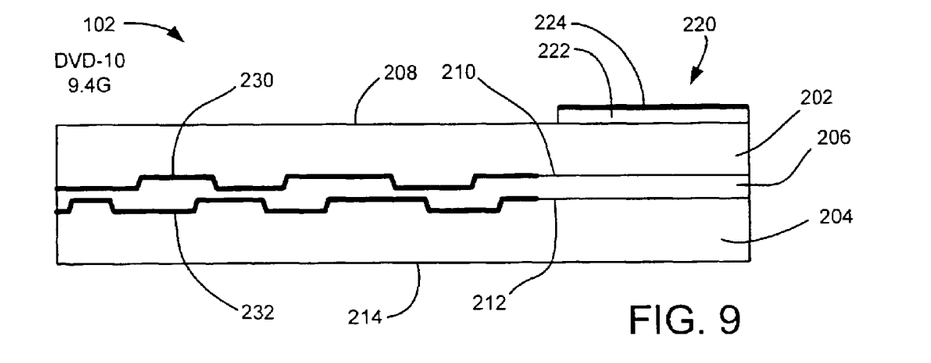
FIG. 9 is a DVD-10 optical disc configuration in accordance with another preferred embodiment.

FIG. 9 shows the disc to have a format in accordance with DVD-10 (9.4 G), and is a two sided, two layer disc with embedded reflective layers 230, 232. The disc must generally be flipped over to allow access to the top reflective layer 230. The bottom reflective layer 232 and the authentication zone 220 are both accessed while the disc 102 is oriented as shown in FIG. 9.

Figure 10:
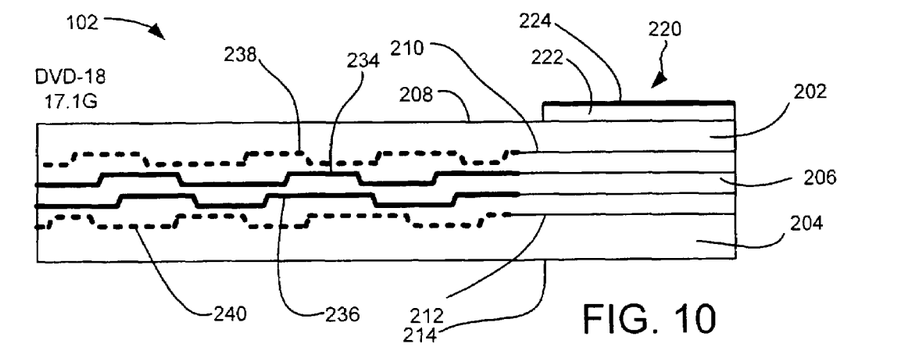
FIG. 10 shows a DVD-18 optical disc configuration in accordance with another preferred embodiment.

FIG. 10 illustrates the disc 102 formatted in accordance with DVD-18 (17.1 G), and is a two sided, four layer disc with embedded reflective layers 234, 236 and embedded semi-reflective layers 238, 240. Note that the transducing beam passes through several interior boundary layers prior to accessing the authentication zone 220, but access otherwise takes place as discussed above.

Figure 11:
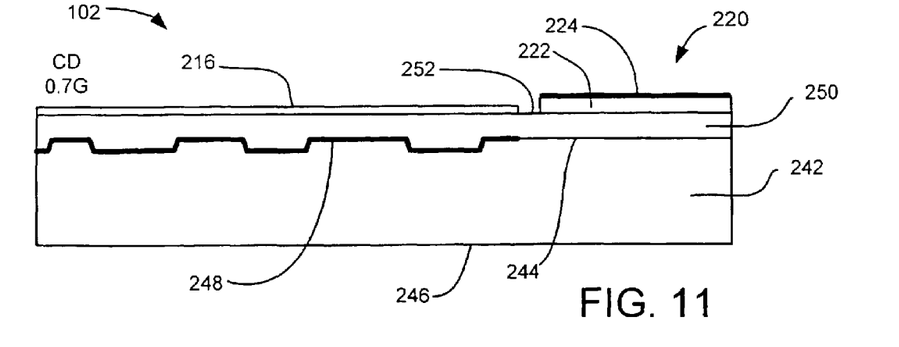
FIG. 11 illustrates a compact disc (CD) format configuration in accordance with another preferred embodiment.

While FIGS. 6-10 have represented the disc 102 formatted in accordance with various DVD formats, such is not limiting. Rather, the disc 102 could take any number of existing or future developed formats. For example, FIG. 11 illustrates the disc 102 as a conventional CD (0.7 G) with a polycarbonate layer (subdisc) 242 with boundaries 244, 246 and a reflective metallized layer 248 on the boundary 246. A protective layer 250 with upper substrate boundary 252 is formed on the subdisc 242 as shown, and the authentication zone 220 is formed on the protective layer 250. The recording layer 248 and the authentication zone 220 are both accessed from below, as before. The CD of FIG. 11 is particularly suited for use of a degrading type dye in the recording layer 222 that degrades from exposure to a "normal" red CD data transducing laser.

While the foregoing exemplary formats of have been contemplated as comprising pre-recorded discs, it will be recognized that such is not necessarily limiting; rather, the various internal recording layers (e.g., 218, 226, 228, 230, 232, 234, 236, 238, 240, 248) could alternatively be configured to be recordable as desired, and the layer 220 could be recordable or pre-recorded. Rendering the layer 220 as an initially "blank" recordable zone, and then recording data to it before completion of the disc 102 provides the same result (i.e., a "pre-recorded zone") as if the layer 220 were formed from a metallized pit and land structure; accordingly, such is viewed as a "pre-recorded" layer for purposes of the appended claims below.

Figure 12:
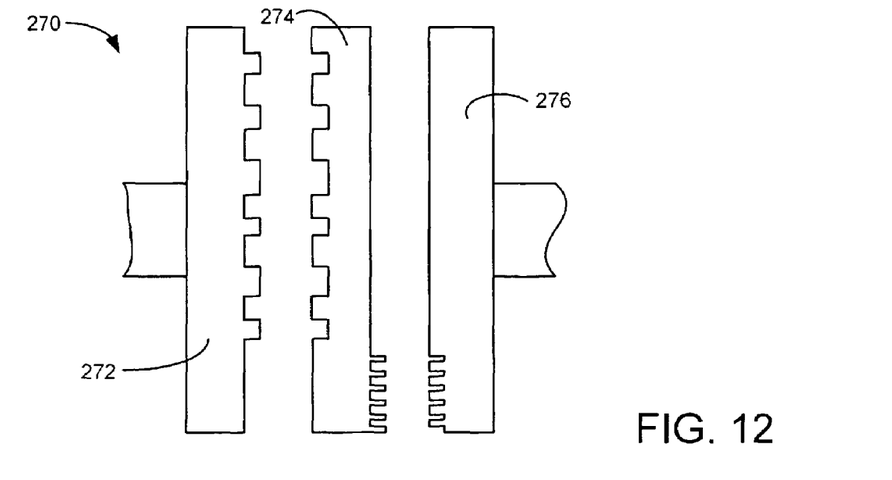
FIG. 12 depicts a substrate in conjunction with a molding cavity to illustrate a preferred methodology for forming a selected substrate.

When incorporating the authentication zone into an otherwise conventional pre-recorded disc, one preferred approach is to provide stampers on opposing sides of a molding cavity 270 used in the formation of the replicated discs, as depicted by FIG. 12. A first stamper 272 forms a portion of the mold cavity and provides the pattern for the embedded recording layer on a first side of an injection molded substrate 274. A second stamper 276 is disposed on an opposing side of the mold cavity 270 to form the wiggle pre-groove (or other features) on a second, opposing side of the substrate 274. Remaining processes are carried out to complete the replicated discs.

From FIG. 12 it will be noted that the configuration of the mold and the characterization of what portion of the disc 102 comprises the generalized substrate 274 will depend upon the format of the disc. For example, for the DVD-9 format of FIG. 8, the substrate 274 can comprise the top subdisc 202, since in FIG. 8 the top surface 208 of the top subdisc 202 receives the wiggle pre-grooves and the bottom surface 210 of the top subdisc 202 receives the pit and land sequence to which the reflective layer 226 is adhered. In this case a composite substrate is subsequently formed by the bonding of the bottom subdisc 204 to the top subdisc 202 during the completion of the disc replication process.

In other cases, the substrate 274 of FIG. 12 can represent a composite of multiple internal layers that separately formed and subsequently bonded together, such as the top subdisc 202 and the bottom subdisc 204 for the DVD-5 disc in FIGS. 6 and 7. Thus, it will be recognized that the molding process represented by FIG. 12 can be viewed as a concurrent or sequential operation, depending upon the requirements of a given application.

Figure 13:
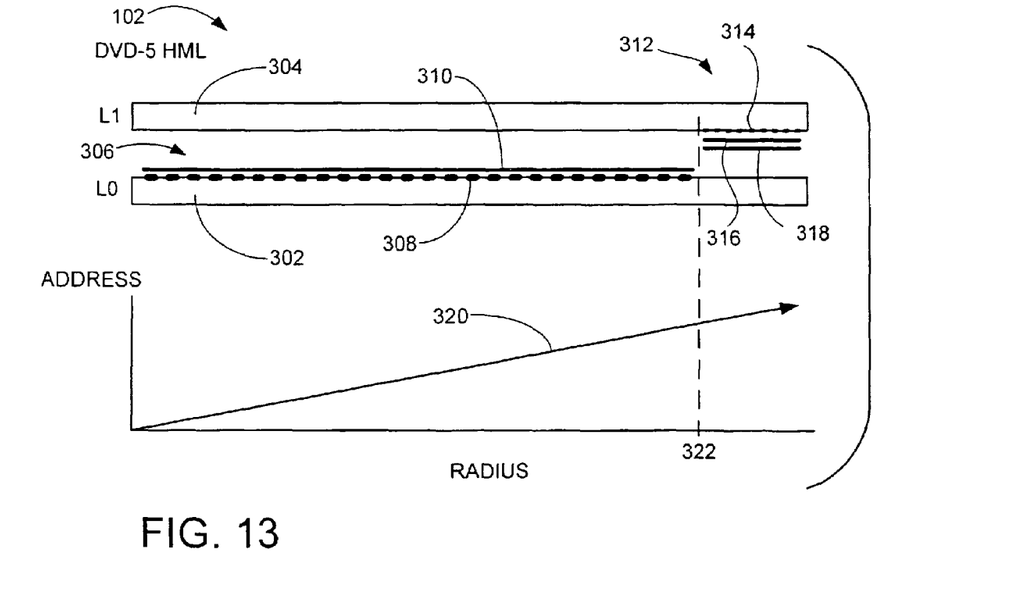
FIG. 13 shows an addressing scheme for a DVD-5 compatible format disc in accordance with another preferred embodiment.

FIG. 13 shows the disc 102 in accordance with another preferred embodiment of the present invention referred to herein as the Hybrid Multi-Layer DVD-5 (HML) disc. In FIG. 13, two substrates 302, 304 are provided and affixed together using a suitable material (not shown). The substrate 302 includes one data storage layer 306, in this case L0, comprising a sequence of embossed pits and lands 308 and a metallized layer 310.

The substrate 304 includes another data storage layer 312, referred to as L1, which has one or more recordable areas (just one area is shown in FIG. 13). The recordable area comprises a wiggle pregroove 314, a reflective layer 316 and a dye layer 318. As before, data are written to the recordable area by selectively exposing the dye layer 318 (while positioning the head using the wiggle pregroove 314), thus providing a series of indelible "stripes" of varying reflectivity to function as pits and lands during readback.

The data storage layer 306 is provided with a first set of addressable sectors, or blocks, which sequentially increment by radius as depicted graphically by address curve 320. The data storage layer 312 is provided with a second set of addressable sectors, or blocks, which continue to increment as shown by curve 320. Thus, addresses on L0 increment starting at the lowest address at L0 inner radius and increment to a higher address at the identified L0 to L1 jump point at 322. Addresses continue to increment from the L1 jump point to a highest address at L1 outer radius. It will be noted that in an alternative embodiment the layers L0 and L1 can be reversed, as desired so that the data storage layer 306 is provided on the upper substrate 304 and the data storage layer 312 is provided on the lower substrate 302.

Figure 14:
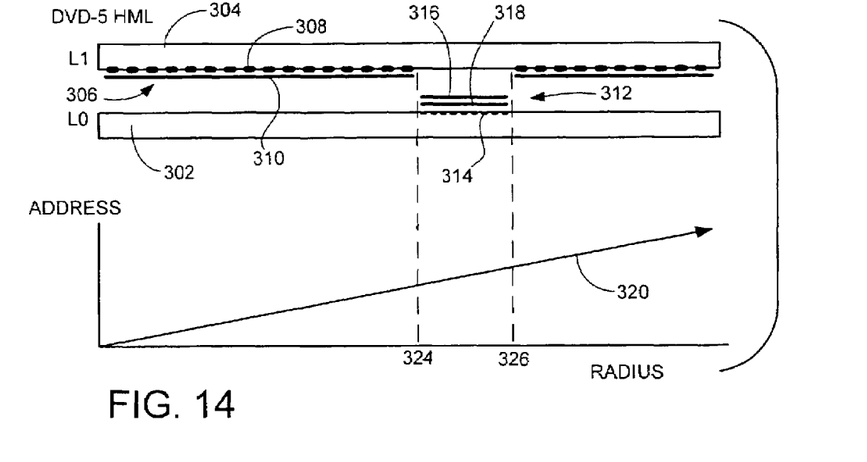
FIG. 14 shows another addressing scheme for a DVD-5 compatible format disc in accordance with another preferred embodiment.

FIG. 14 provides another alternative embodiment for the HML DVD-5 disc 102 which includes more than one jump point. More particularly, in this case a first jump point 324 is from pre-recorded layer L1 to recordable layer L0 and a second jump point 326 is from recordable layer L0 back to pre-recorded layer L1. As before, addresses continually increment with radius, regardless of layer.

Figure 15:
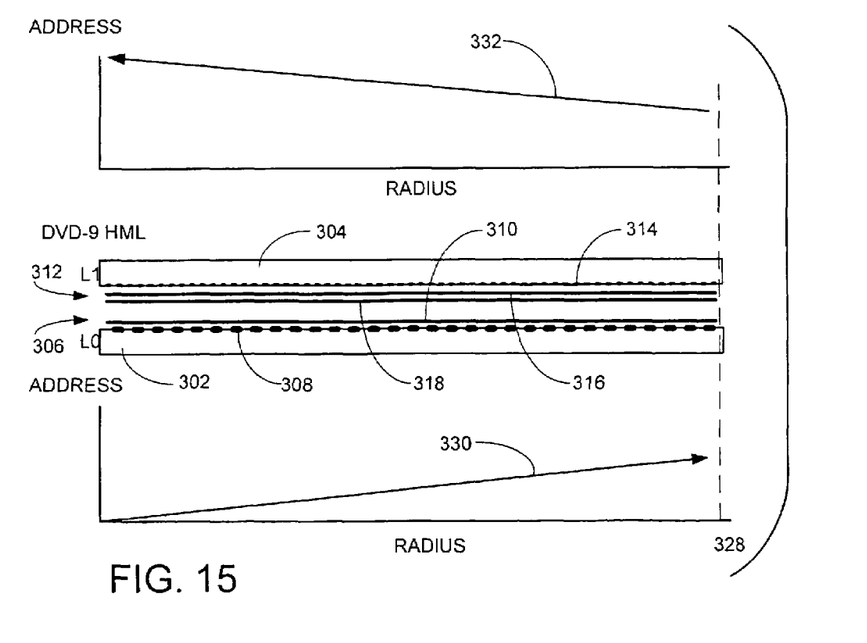
FIG. 15 illustrates another addressing scheme for a DVD-9 compatible format disc in accordance with another preferred embodiment.

FIG. 15 provides yet another alternative embodiment for the optical disc 102 characterized as an HML DVD-9 disc. In this case, the respective L0 and L1 data storage layers 306, 312 substantially extend all the way across the radius of the disc 102. As shown graphically by address curves 330 and 332, addresses increment across layer 0, jump to layer L1 at jump point 328, and increment back across layer L1, with the recorded data in layer 1 read seamlessly with the prerecorded data on layer 1.

As will be recognized, conventional readback devices typically do not focus on individual information layers based on absolute thickness or focal depth, as there can be very large variations in the surface flatness of an optical disc, as well as manufacturing tolerances in the thickness of substrates themselves. Instead, readback devices determine which layer of a multi-layer disc is currently being read by the contents of addressing, i.e. some addresses are only present on one layer and other addresses are only present on a second layer. Therefore the readback device assumes that when it is reading a given address it is on a certain layer.

Accordingly, a unique property of the HML disc 102 as described herein is that the two combined layers will contain a set of addresses that normally belong to a single information layer. A portion of the addresses in the set will be contained in the pre-recorded information on one layer and a portion of the addresses being contained on the recordable or re-writable layer (after recording or re-writing). Generally, this unique addressing scheme will tend to guarantee that the HML disc will be readable by standard multi-layer reading devices such as DVD-Video and DVD-ROM.

Advantages of HML over conventional single layer hybrid discs include the fact that standard manufacturing systems and methods can be used to create both the pre-recorded information layer and the recordable or re-writable information layer, thereby reducing manufacturing costs.

It is understood that although DVD-5 and DVD-9 are used as examples, the HML technology can be utilized with any number of disc configurations, including existing and future developed formats. Those skilled in the art can readily utilize existing techniques to generate discs in accordance with the present discussion, and can further readily utilize existing writer and readback devices to both record the desired data to the recordable areas on the discs and readback the prerecorded and recordable content. Thus, diagrams and further discussion with regard to such aspects of the present disclosure are unnecessary for a full understanding of the present discussion.

The DVD-5 examples of FIGS. 13 and 14 utilize parallel track path (PTP) addressing in the respective prerecorded and recordable zones. That is, the direction of reading (from ID to OD) is the same for both zones. The DVD-9 example from FIG. 15 utilizes opposite track path (OTP) addressing, in that the data from the prerecorded layer 0 are read from ID to OD, and then the data recordable zone in layer 1 are read in the opposite direction (OD to ID). Thus, any number of different reading directions can be used, including "serpentine" disc configurations where layers go "back and forth" among the various layers, depending upon the requirements of a given application.

It will be further noted that the DVD-9 has the recordable data zone in layer 1 "over" prerecorded data in layer 0, so that the transducing optical pickup focuses through the semireflective layer in layer 0 to read this zone in layer 1. Thus, while some embodiments have left "gaps" in layer 0 to read the recordable zone in layer 1 (or vice versa), this is not limiting as evidenced by FIG. 15.

The foregoing various embodiments provide significant flexibility and enhanced processing capabilities in the manufacture of optical discs. By way of illustration, a content supplier desiring to have a population of optical discs manufactured for distribution purposes can take advantage of the various embodiments such as in according with the following preferred steps.

First, the content supplier can supply content data and a number of specially configured substrates to a replication facility which offers disc manufacturing and/or replication services. The content data can be supplied via electronic transfer such as by the Internet or by physically shipping the content data on one or more data storage mediums. The specially configured substrates can be shipped together with the data storage mediums or fabricated elsewhere and forwarded to the replication facility as directed by the content supplier.

The specially configured substrates preferably have a form such as the top substrate 156 in FIG. 4, with the associated data storage layer 158 storing pre-recorded control data associated with the content data. The control data can comprise unique serial numbers, product activation codes, patches to update the control data, etc. as desired. Preferably, if a quantity X of optical discs are desired, then the content supplier can supply that particular number of specially configured substrates (or might alternatively supply X+n substrates where n is some small number of additional substrates to accommodate scrap or other production related issues, etc.).

Second, the replication facility can proceed to form content data substrates in a conventional fashion, as represented by the bottom substrate 150 in FIG. 4. The content data substrate (s) each have one or more content data storage layers (e.g., 152, FIG. 4) configured to store the content data using appropriate encoding techniques. It will be noted that the content data can be stored as a series of embossed pits and lands, or the content data storage layer(s) can be recordable and the content data can subsequently be recorded thereto, as desired.

Third, the replication facility affixes each of the specially configured substrates (e.g., 156) to each corresponding content data substrate (e.g., 150) to form the desired population X of optical discs. The respective data storage layers are oriented so as to be accessible by a data transducing beam passing through a common exterior boundary surface of the discs, such as depicted at 161 in FIG. 4.

In this way, the content supplier can carefully control the total number of discs created. If extra specially configured substrates are provided, these can be returned or otherwise accounted for. Thus, the various embodiments presented herein can be utilized to effectively reduce the unauthorized replication of discs. For example, depending on the application, the playback system 100 can be readily configured to prevent nonauthorized discs (which do not have the specially configured layers) from operating properly.

In a related approach, the content supplier can provide the carefully enumerated set of substrates as "blanks" of the layers containing the recordable areas to a replication facility with instructions to complete the discs by mastering the embossed data on the layer L0 and then mate the layers L1 and L0.

The disclosed embodiments thus give virtually any existing DVD manufacturer the ability to create serialized/uniquely identified discs on existing equipment, which is a significant advance over the prior art and provides an important, long-desired capability. The recordable layers can alternatively, or additionally, be used to store software "patches" or updates that are supplied by the content source so that the same, previously mastered pre-recorded substrate can be mated with "updated" recordable substrates. The recordable layers can alternatively, or additionally, be updated during end user use to control or enhance operation of the content stored in the pre-recorded layer.

Moreover, because the respective layers are provided on different boundary surfaces within the disc 102, production issues associated with attempting to provide both pre-recorded and recordable zones on the same substrate surface are completely eliminated.

For purposes of the appended claims, the term "pre-recorded" will be construed consistent with the foregoing discussion to describe a structure that currently stores selected data. This includes a fixed structure (such as embossed pits and lands) as well as a recordable structure that has, in fact, received data recorded thereto. The term "recordable" will be construed consistent with the foregoing discussion to describe a structure adapted to store selected data, and can either be recorded to only once (e.g., a WORM structure) or can be repeatedly recorded, erased, and re-recorded (write many structure).

Reference in the appended claims to the orientation of data storage layers so that such are accessible by a data transducing beam through a common exterior surface of the disc will be understood consistent with the foregoing discussion to not require physical inclusion of the beam in the claimed structure, only to describe the structural orientation of such layers. More particularly, such layers are oriented so as to both be accessible from the same side of the disc, as compared to an orientation where the beam is applied from opposite sides of the disc in order to access the layers. It is not required that both layers be actually accessible at the same time; hence, the layers may overlap such as depicted by FIG. 15, or may be radially exclusive such as depicted in FIGS. 4-14 so that, at some radial positions, one of the layers is accessible and at other radial positions, the other layer is accessible.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

The invention claimed is:

1. An optical disc comprising a first substrate comprising a pre-recorded, first data storage layer and a second substrate comprising a recordable, second data storage layer, wherein the second substrate is affixed to the first substrate using an intervening bonding layer disposed between the first and second data storage layers to permit reading from the respective first and second data storage layers using a beam that passes through a common exterior surface of the disc, wherein the first data storage layer comprises first data stored in a first range of addressable blocks, wherein the second data storage layer comprises second data stored in a second range of addressable blocks, and wherein the first and second ranges successively increment over an overall range of addresses such that a readback system associated with the data transducing beam interprets the first data and the second data as being disposed on a common recording layer within said disc.

2. The optical disc of claim 1, wherein the second data comprise a unique serial number assigned to the optical disc, the unique serial number different from serial numbers assigned to other optical discs formed during the manufacture of the optical disc.

3. The optical disc of claim 1, wherein data are recorded to the recordable, second data storage layer using a writing beam prior to the affixing of the second substrate to the first substrate.

4. The optical disc of claim 1, wherein the second data comprise control data used to control access to content data on the pre-recorded, first data storage layer.

5. The optical disc of claim 1, wherein the first data storage layer is embedded at a first elevational distance from the common exterior surface and the second data storage layer is embedded at a second elevational distance from the common exterior surface in a non-overlapping relation to the first data storage layer.

6. The optical disc of claim 1, wherein the first data storage layer further comprises third data stored in a third range of addressable blocks following the second range so that the first, second and third ranges successively increment over an overall radius of the disc, wherein the disc includes a first discontinuous jump point between the first and second ranges and a second discontinuous jump point between the second and third ranges.

7. The optical disc of claim 1, wherein the data transducing beam passes through said bonding layer when accessing a selected one of the first or second data storage layers while not passing through the remaining one of the first or second data storage layers.

8. The optical disc of claim 1, wherein the pre-recorded, first data storage layer comprises user data, and wherein the recordable, second data storage layer comprises a data key which, upon successful retrieval of said key using said data transducing beam, permits retrieval of said user data.

9. The optical disc of claim 1, wherein the pre-recorded, first data storage layer comprises user data, and wherein the recordable, second data storage layer comprises a patch which updates a version of said user data.

10. The optical disc of claim 1, wherein the respective first and second data storage layers each extend substantially across an entire radial extent of the disc.

11. The optical disc of claim 1, wherein a selected one of the first and second data storage layers extends substantially across an entire radial extent of the disc, and wherein the remaining one of the first and second data storage layers has a reduced size so as to extend across substantially less than the entire radial extent of the disc.

12. The optical disc of claim 1 characterized as a DVD compatible disc.

13. The optical disc of claim 1 characterized as a CD compatible disc.

14. A method, comprising:
forming a first substrate comprising a pre-recorded, first data storage layer; and
affixing a second substrate to the first substrate to form an optical disc, the second substrate comprising a recordable, second data storage layer oriented such that the first and second data storage layers are respectively accessible by a data transducing beam adapted to pass through a common exterior boundary surface of the disc, wherein a bonding layer is disposed between the first and second data storage layers to affix the second substrate to the first substrate, wherein a first light beam used to read a selected one of the first or second data storage layers does not pass through said bonding layer, wherein a second light beam passes through said bonding layer when reading the remaining one of the first or second data storage layers, and wherein the first and second layers are further configured to emulate a single information layer within the disc having continuously incrementing addresses over an overall address range.

15. The method of claim 14, wherein the forming step comprises providing a sequence of pits and lands in the first substrate to form the pre-recorded, first data storage layer.

16. The method of claim 14, further comprising a step of using a writing beam to record data to the recordable, second data storage layer prior to the affixing step.

17. The method of claim 14, wherein the pre-recorded first data storage layer comprises a recordable portion, and wherein the method further comprises using a writing beam to record data to the recordable portion prior to the affixing step.

18. The method of claim 14, wherein a content supplier identifies user data to be placed on a selected one of the first and second data storage layers, and wherein the method further comprises the content supplier providing the user data and the remaining one of the first and second data storage layers to a replication facility which carries out at least the attaching step.

19. The method of claim 18, wherein the replication facility additionally carries out the forming step to place the user data on the first data storage layer.

20. The method of claim 14, wherein the first data storage layer comprises first data stored in a first range of addressable blocks, wherein the second data storage layer comprises second data stored in a second range of addressable blocks, and wherein the first and second ranges successively increment over an overall range of addresses such that a readback system associated with the data transducing beam interprets the first data and the second data as being disposed on a common recording layer within said disc.

21. The method of claim 14, wherein the selected one of the first or second data storage layers includes an annular discontinuity aligned with the remaining one of the first or second data storage layers so that the second light beam does not pass through the selected one of the first or second data storage layers.

22. The method of claim 14, wherein a selected one of the first and second substrates further comprises a layer of material having an initial translucency which selectively changes in response to subsequent accesses by said data transducing beam so as to ultimately prevent successful access to the associated data storage layer.

23. The method of claim 14, wherein the pre-recorded, first data storage layer comprises user data, and wherein the recordable, second data storage layer comprises a data key which, upon successful retrieval of said key using said data transducing beam, permits retrieval of said user data.

24. The method of claim 14, wherein the pre-recorded, first data storage layer comprises user data, and wherein the recordable, second data storage layer comprises a patch which updates a version of said user data.

25. The method of claim 14, wherein the respective first and second data storage layers each extend substantially across an entire radial extent of the disc.

26. The method of claim 14, wherein a selected one of the first and second data storage layers extends substantially across an entire radial extent of the disc, and wherein the remaining one of the first and second data storage layers has a reduced size so as to extend across substantially less than the entire radial extent of the disc.

27. The method of claim 14 wherein the optical disc is characterized as a DVD compatible disc.

28. The method of claim 14 wherein the optical disc is characterized as a CD compatible disc.

29. An optical disc formed by a process comprising steps of:
   forming a first substrate comprising a pre-recorded, first data storage layer; and
   affixing a second substrate to the first substrate to form the optical disc, the second substrate comprising a recordable, second data storage layer oriented such that the first and second data storage layers are separated by an intervening bonding layer disposed therebetween, the first and second data storage layers being respectively accessible by a data transducing beam passing through a common exterior boundary surface of the disc over a continuously incrementing address range associated with a single information layer of the disc; and
   using a writing beam to record data to the recordable, second data storage layer prior to the affixing step.

30. A method, comprising:
   supplying content data and a specially configured substrate to a replication facility, the specially configured substrate comprising a pre-recorded data storage layer which stores control data associated with the content data;
   forming at least one content data substrate at the replication facility, the at least one content data substrate comprising a content data storage layer configured to store said content data; and
   subsequently affixing the specially configured substrate to the at least one content data substrate to form an optical disc, the disc adapted such that the pre-recorded data storage layer and the content data storage layer are respectively accessible through a common exterior boundary surface of the disc by a data transducing beam over a continuously incrementing address range associated with a single information layer of the disc.

31. The method of claim 30, wherein the content data storage layer of the forming step comprises a sequence of embossed pits and lands in the at least one content data substrate.

32. The method of claim 30, wherein the content data storage layer of the forming step comprises a recordable portion, and wherein the method further comprises a step of recording the content data to said recordable portion.

33. The method of claim 30, wherein the pre-recorded data storage layer of the specially configured substrate comprises a recordable portion, and wherein the method further comprises a step of using a writing beam to record the control data to the recordable portion prior to the supplying, forming and subsequently affixing steps.

34. The method of claim 30, wherein the control data comprises disc authentication data used to identify said disc as an authorized copy.

35. The method of claim 30, wherein the control data updates a version of the pre-recorded, first data storage layer comprises user data, and wherein the recordable, second data storage layer comprises a patch which updates a version of said user data.

36. The method of claim 30 wherein the optical disc is characterized as a DVD compatible disc.

37. The method of claim 30 wherein the optical disc is characterized as a CD compatible disc.

* * * * *